Nov. 8, 1966  C. W. MOORE ETAL  3,284,144

BEARINGS

Filed June 8, 1964

INVENTORS
CHARLES W. MOORE
REGINALD L. BRANDON, III
JAMES P. SMYLY
BY
Carpenter, Abbott, Coulter & Kinney
ATTORNEYS United States Patent Office 3,284,144
Patented Nov. 8, 1966

3,284,144
BEARINGS
Charles W. Moore and Reginald L. Brandon III, Laurens, S.C., and James P. Smyly, Soddy, Tenn., assignors to American Lava Corporation, Chattanooga, Tenn., a corporation of Tennessee
Filed June 8, 1964, Ser. No. 373,280
3 Claims. (Cl. 308—3)

This invention relates to ceramic bearings. More particularly the invention relates to ceramic gas-lubricated bearings having a high alumina content as well as a method for making the same.

The use of films of gas or air for lubrication of bearings, usually of metal, is now well known and has received considerable analysis as, for example, that set forth in a book entitled "Gas Film Lubrication," by W. A. Gross of the IBM Research Laboratory, published by John Wiley & Sons, Inc.

Although enamel-type bearing surfaces have been known (see, for example, Michael U.S. Patent No. 3,037,828), and although a metal drill moving or guided within an alumina ceramic bushing has been known (see, for example, Armacost U.S. Patent No. 3,022,685), no one prior to our invention, insofar as we are aware, has presented the art with a reliable wear-resistant and durable ceramic air or gas-lubricated bearing, particularly one having a high alumina content.

The bearings of this invention have at least two parts or bodies of ceramic, each of which presents a bearing surface to the other. They are useful in a variety of bearing applications, an example of which is illustrated in the drawing made a part hereof.

Figure 3:
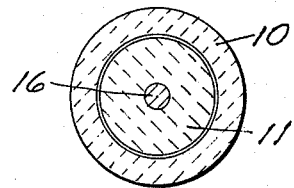
FIGURE 3 is an end view of a preferred gas lubricated bearing embodiment of the invention.

The preferred gas-lubricated ceramic bearing illustrated in FIGURE 3 consists of an outer sleeve 10 and an inner cylindrical shaft 11 so mated that the radial clearance between the surface of the internal cylindrical bore of the sleeve and the external surface of the shaft is between 0.00001 (ten one-millionth) and 0.0005 (five ten-thousandth) of an inch, and preferably between 0.0001 (one ten-thousandth) and 0.0003 (three ten-thousandth) of an inch. By radial clearance is meant the distance between the surfaces when the shaft is exactly centered in the bore of the sleeve; thus the total clearance, opposite the side of the shaft when it is rested against one side of the bore, would be approximately twice the radial clearance between the shaft and bore. If the radial clearance is increased significantly beyond 0.0005 of an inch, the result is that problems arise in gaining proper gas lubrication of the bearing during operation (i.e., it tends not to become "air-borne"). Also, shattering during operation may be encountered. Below the maximum radial clearance aforementioned, and particularly below the upper limit of the preferred range for radial clearance, bearings of the preferred embodiment of this invention exhibit a self centering phenomenon apparently caused by shearing forces on gases between the surfaces of the bearing during rotation.

Figure 1:
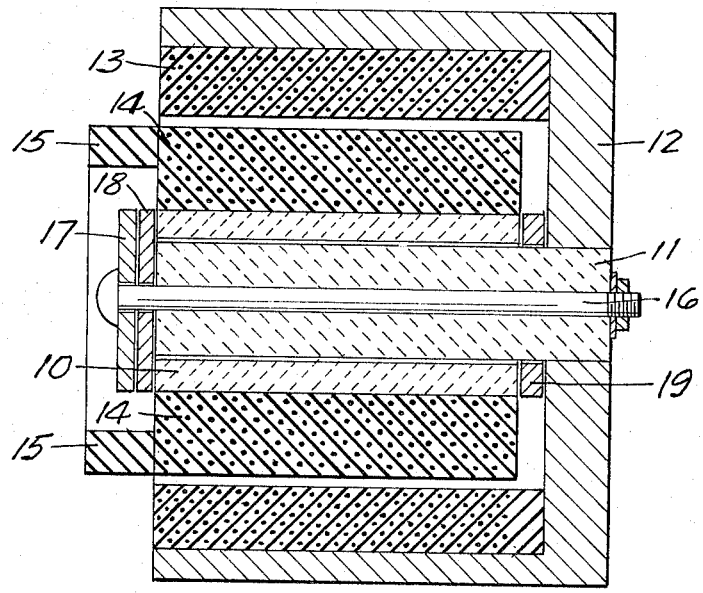
FIGURE 1 is a cross-sectional view through an electric motor.
Figure 2:
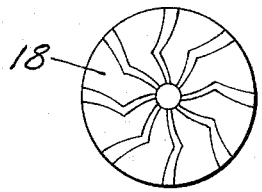
FIGURE 2 is a plan view of a thrust washer.

Referring now to FIGURE 1, the construction of an illustrative device in which the preferred gas-lubricated bearing of the invention is used will be discussed. Shaft 11 is illustrated in FIGURE 1 as being somewhat longer than sleeve 10 of the air bearing. The extra length of shaft 11 (which may vary in diameter from the bearing surface part) suitably is used as a mounting pin for holding the bearing shaft 11 in position with respect to housing member 12 of the electric motor. Housing member 12 of the motor also carries the field windings 13, electric feed-in wires (not shown), and any suitable mounting means or brackets (not shown) to hold it in operating position, as desired.

Affixed to the sleeve member 10 of the air bearing is the armature 14 for the motor, which, as shown, is suitably provided with an extension 15 upon which a pulley or other member to be driven may be mounted. A pin 16, extending through shaft 11 is used as a holder for retaining washer 17 which in turn serves to hold a suitable thrust washer 18 in position. The thrust washer 18 acts as the means to limit outward shift of the assembly consisting of the rotatable sleeve 10 and armature 14. An additional thrust washer 19 may be used to limit inward shift of that assembly during rotation thereof. Other structural arrangements to prevent lateral shift of the bearing members may be employed.

At this point it should be observed that even the thrust washers shown in FIGURE 1 are preferably made of ceramic. Thus, the combination of the sleeve member 10 and a thrust washer constitutes a gas-lubricated ceramic bearing assembly, as herein discussed, although not the preferred embodiment for gas lubricated bearings of the invention. In general, the thrust members are provided on their lateral bearing surfaces with gas-entraining grooves, suitably herring-boned as illustrated in FIGURE 3. However, other radially extending grooves slanted to pick up air or gas as the thrust washer rotates may be used instead of a herring-bone pattern. Indeed, the grooves may even be omitted from a thrust washer (as, for example, the thrust washer 19). Far more important than grooving is the nature of the bearing surface of the ceramic bodies of this invention.

The ceramic surfaces on the gas-lubricated bearing bodies hereof are smooth, with a surface smoothness finish (or "roughness" heights average) no greater than twenty root-means-square (R.M.S.) microinches when checked with a 0.030 inch roughness width cutoff and diamond stylus used with a radii of 0.0005 inch. Such is a standard cutoff and stylus according to military standards (MIL–STD–10A), dated October 13, 1955. For optimum performance, the surface finish preferably is no greater than ten R.M.S. microinches. The bearing surfaces are free of flaws and surface imperfections or pits more than about 0.003 of an inch in depth.

A further significant characteristic of the bodies forming the gas-lubricated bearings hereof is their crystalline structure. The bodies are composed of at least 91% by weight of alpha alumina in the form of discrete crystals. Preferably these discrete crystals account for at least 94% by weight of the bodies, up to about 98% of the weight of the bodies At least 98% of the alpha alumina crystals lie within the size range of about 0.5 to 40 microns as their maximum dimension. A few crystals may be considerably larger, with about 150 microns being the maximum size in usual practice. The preferred average size range (the limits of the average size) for the crystals will usually lie within 3 to 10 microns, but variations outside this range and within the limits aforementioned give operable results. The crystals of alpha alumina are firmly compacted together into a dense structure.

Up to about 6% by weight of the bodies, and at least 2% of their weight, consists of a glassy matrix as a phase distinct from the discrete alpha alumina crystals present in the bodies. This matrix is largely silica glass containing alumina and magnesia; but other glassy materials than silica may be employed, if desired, with preference lying for refractory glassy materials (such as silica with alumina and magnesia). In addition to the foregoing, other inorganic materials may be present in the bodies as minor impurities (e.g. one or two percent), either intentionally or inadvertently, without upsetting required parameters. For example, a percent or so of manganese oxide, titanium dioxide, or iron oxide may be added to promote sintering. Where minor impurities cause crystalline phases other than alumina, our experience has been that the size of the particles or crystals generally does not exceed about 10 microns. From an over-all standpoint, at least 94% by weight of the bodies consists of alumina, whether in the glassy matrix (or grain boundaries) or in the crystalline phase of the bodies. Grain boundaries between alpha alumina crystals are occupied with a glassy matrix which may or may not contain dissolved alumina. They preferably contain dissolved alumina and magnesia.

The density of these bodies must at least reach approximately 89% of theoretical density, preferably at least 92% of theoretical density. Generally the density will reach at least 3.6 grams per cc. Voids or pores within the bodies must not exceed about 10% of the volume of the bodies (at least in the portion of the bodies serving the bearing function), with individual pores being no greater than about 0.01 inch in cross section (preferably no greater than 0.003 inch in cross section).

The following procedure has been used to make bearings in accordance with the invention. Approximately 95% by weight alpha alumina, 3% by weight talc (e.g., magnesium silicate) and 2% by weight clay (e.g., hydrated aluminum silicate), is placed in an alumina-lined ball mill which contains, per 100 parts by weight of the foregoing ingredients, about 15 parts by weight of a wetting agent (e.g., sodium pentaphosphate), about 1.25 parts organic binder (e.g., polyvinyl alcohol), and about 0.2 part deflocculent (e.g., lignin sulfate). Then follows the addition of about 55 parts by weight of water and 200 to 500 parts by weight of alumina pebbles as a grinding media. Ingredients in the mill are milled for about 20 hours to gain intimate mixing and a reduction of particle size below about 5 microns. The resulting slip is spray dried at an elevated temperature (e.g., 212° F.–500° F., preferably about 400° F.) to as low a moisture content as practicable, at least below 4% and preferably below 2% by weight.

Sprayed "dust" material is then mixed with binders (such that total burn-out or organic binder content does not exceed about ten parts per 100 parts inorganic content) by a blending and kneading action (as in a Muller type mixer) for approximately 30 minutes or until the mixture is thoroughly blended and plasticized, as is conventional in the art.

A suitable illustrative binder-dust mixture consists, by weight, of about 100 parts of the sprayed "dust" material, 1 part of a paraffin wax emulsion (containing approximately equal parts by weight of paraffin and water), plus either 15 parts of a 2.0% water solution of lignin extracted from sea-weed or 17 parts of a 20% glycol solution of polyvinyl alcohol. Sufficient water is added to this mixture to give a total moisture content of about 17%. The mixture is a plastic readily-extrudable mass.

The plastic mass is charged into the cylinder of an extrusion press, de-aired by means of a vacuum pump, and extruded to the size and shape of bodies or parts for gas-lubricated bearings as, for example, illustrated in the drawing.

Prior to firing the extruded shapes, they are dried and sawed and machined to the shape and size desired, keeping in mind that the final firing will cause some shrinkage. A few test firings may be used to determine the shrinkage of the material according to conventional techniques, as well known in the ceramic art; and the results of those test firings will dictate the size and shape of green (i.e., unfired) bodies to form in order to gain the desired size and shape for final fired products on a commercial run.

Firing is suitably accomplished by raising the temperature from room temperature to about 3100° F. within a period of about 24 hours. The temperature of 3100° F. is maintained from about 1 to 4 hours, following which the temperature is lowered to about 400° F. within 16 to 20 hours. Thereafter, cooling to room temperature is allowed.

The bearing surfaces of the parts are ground and polished to final size and finish using conventional techniques with diamond grit and diamond paste. Bearing surface finishes of about 10 R.M.S. microinches or less are readily formed when the procedure hereinabove described for making the ceramic is followed.

Gas-lubricated bearings for a motor as illustrated were made according to the foregoing method. The shaft member was 0.31217 to 0.31218 of an inch in diameter and straight along its bearing surface length. The internal bore of the sleeve member was 0.31259 to 0.31260 of an inch in diameter and also straight along its bearing surface length. The length of the sleeve was .845 inch; and the length of the shaft .9 inch. Mounted as part of an electric motor as illustrated in FIGURE 1, the resulting air bearing was found to offer surprisingly little resistance to rotational movement. One might conjecture that the electrical field of the motor may aid, through its influence on the armature, in centering the rotation of the armature-mounted sleeve about the shaft so as to provide an essentially uniform radial clearance for this bearing of about 0.0002 of an inch; however, tests of rotation of the shaft member within the sleeve, in applications other than where an electrical or magnetic field is present, also indicate surprisingly smooth rotational operation with very low resistance and long coasting time. Such results are accomplished without special means to force air between the bearing surfaces, which appears to be directly contrary to the precepts for gas-lubricated bearing operation as conventionally understood.

While we do not fully understand all of the theoretical reasons behind the performance of our gas-lubricated bearings, we do believe that the hardness and smoothness of the bearing surfaces is a large factor accounting for their performance. Further, we feel that the gas-shearing action between surfaces of our bearing as rotation takes place tends to force free gas between surfaces of the bearing (i.e. that free gas between the bearing surfaces opposite the side of the bearing surfaces resting in contact with each other during a stationary moment) into a position between all parts of the bearing surfaces and cause a self centering action for the parts during rotation. Depending upon the radial clearance, and possibly the geometry, the speed of rotation at which the bearing can be characterized as "gas-borne" will vary, bearings of lower radial clearance tending to become "air-borne" or "gas-borne" at lower rates of revolution than those of higher radial clearance.

That which is claimed is:

1. A wear-resistant essentially-frictionless bearing consisting essentially of two bodies which present smooth bearing surfaces to each other, said bodies being ceramic bodies of a composition consisting essentially of 91 to 98% by weight of alpha alumina crystals, and at least 2% up to 6% by weight of a refractory glassy matrix, said crystals of alumina being no greater than 150 microns in any dimension, with 98% of the same lying in the range of 0.5 to 40 microns, the material of said bodies being highly compacted such that the density for said bodies is at least 89% of theoretical, with no voids greater than 0.01 inch in cross section in said bodies; the bearing surfaces of said bodies being provided with a surface finish, as described herein, no greater than 20 R.M.S. microinches.

2. The bearing of claim 1 wherein the glassy matrix of the ceramic bodies consist essentially of silica with alumina and magnesia distributed randomly therethrough.

3. A wear-resistant essentially-frictionless bearing consisting essentially of an outer sleeve having an internal cylindrical bore and an inner cylindrical shaft rotatable within said cylindrical bore, said sleeve and shaft being ceramic bodies of a composition consisting essentially of 91 to 98% by weight of alpha alumina crystals, and at least 2% up to 6% by weight of a refractory glassy matrix, said crystals of alumina being no greater than 150 microns in any dimension, with 98% of the same lying in the range of 0.5 to 40 microns, the material of said bodies being highly compacted such that the density for said bodies is at least 89% of theoretical, with no voids greater than 0.01 inch in cross section in said bodies; the internal surface of said cylindrical bore and the external surface of said cylindrical shaft being smooth with a surface finish no greater than 20 R.M.S. microinches, and further being so mated that the tolerance between said surfaces is between 0.0005 and and 0.00001 of an inch.

References Cited by the Examiner
UNITED STATES PATENTS 2,696,413  12/1954  Wheildon _____ 308—3
3,037,828  6/1962  Michael _____ 308—238

DAVID J. WILLIAMOWSKY, *Primary Examiner.*

FRANK SUSKO, *Examiner.*